(12) United States Patent
Schneider-Hufschmidt

(10) Patent No.: US 6,298,230 B1
(45) Date of Patent: Oct. 2, 2001

(54) RADIO-OPERATED COMMUNICATIONS TERMINAL WITH NAVIGATION KEY

(75) Inventor: Matthias Schneider-Hufschmidt, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/212,838

(22) Filed: Dec. 16, 1998

(30) Foreign Application Priority Data

Dec. 16, 1997 (DE) .............................................. 297 22 222

(51) Int. Cl.⁷ .................................................... H04M 1/66
(52) U.S. Cl. ........................... 455/411; 455/90; 455/550; 455/566; 382/115; 382/124
(58) Field of Search ..................................... 455/410, 411, 455/566, 66, 74, 90, 550; 382/115, 124, 224, 227; 345/145, 156, 157, 160, 169

(56) References Cited

U.S. PATENT DOCUMENTS 5,465,401 * 11/1995 Thompson ........................... 455/566
5,848,231 * 12/1998 Teitelbaum et al. ................. 395/186
6,088,585 * 7/2000 Schmitt et al. ...................... 455/411

FOREIGN PATENT DOCUMENTS 93 04 488 U1    9/1993 (DE) .

* cited by examiner

*Primary Examiner*—Lee Nguyen
(74) *Attorney, Agent, or Firm*—Schiff Hardin & Waite

(57) ABSTRACT

Radio-operated communications terminal (1) with a navigation key (4) arranged on the keyboard surface thereof. A sensor (5) is positioned for recognizing biometric data (fingerprints) in the region of the keyboard surface such that an optimal operating position is achieved for the user for the purposes of his/her identification. This is achieved in that the sensor (5) is integrated into the actuating surface of the navigation key (4).

10 Claims, 1 Drawing Sheet

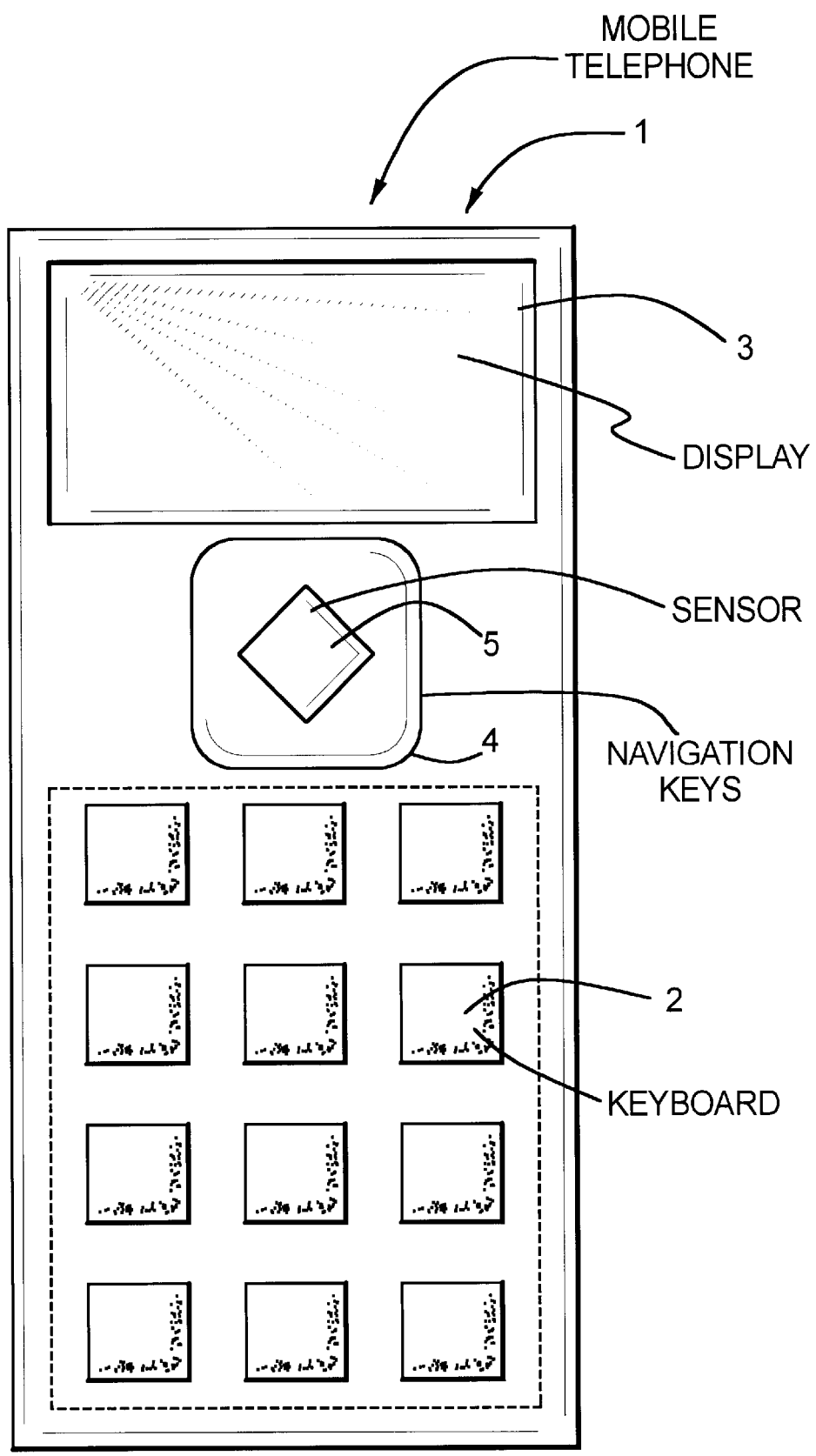

RADIO-OPERATED COMMUNICATIONS TERMINAL WITH NAVIGATION KEY

BACKGROUND OF THE INVENTION

The present invention relates to a radio-operated communications terminal with a navigation key arranged on its key surface.

Radio-operated communications terminals, particularly of mobile parts of cordless telephones or hand-held portables, are becoming dimensionally smaller due to customer demand. This results in greater difficulties in accommodating the necessary number of keys on these devices. In addition, with the connection of Internet-capable mobile parts, it is necessary to incorporate known navigation keys for what are known as Internet browsers into the keyboard of this device. The keys enable movement of a cursor in a graphic display. Due to the functions performed by such navigation keys, they are relatively large, since a navigation in up to eight directions, as well as an actuation by pressing, can be performed with these keys.

The utilization of sensors for recognizing biometric data such as fingerprints in handheld communication devices is also known. German reference DE 93 04 488 U1 discloses such an arrangement. In this known arrangement, the biometric scanning system consists of a window arranged in a handheld apparatus, an optic, an image capture sensor, and at least one light source illuminating the window. The image capture sensor is connected to a cryptochip.

In commercial mobile telephones, however, the accommodation of a sensor which transmits fingerprints is associated with difficulties, due to the size of the devices. On the back of the device, use is perceived as uncomfortable, while, given an accommodation on a narrow side, one group of people is advantaged or disadvantaged, respectively, according to whether they hold the device in the left hand or the right hand when telephoning. The accommodation of the sensor on the surface of the device which has the keyboard is hardly possible for reasons of space, due to the display and the keyboard, since a sensor requires an area of approximately 100 to 200 mm$^2$.

SUMMARY OF THE INVENTION

It is an object of the present invention to provide a sensor for recognizing biometric data such that an optimal operating position is achieved for the user for the purpose of his/her identification. This object is inventively achieved in that the sensor for recognizing biometric data is integrated into the actuating surface of the navigation key.

Such an arrangement guarantees that the sensor can be effectively reached not only by the right thumb but also by the left thumb of the respective user. Furthermore, it can be guaranteed by an appropriate design of the navigation key that, in the normal use of the navigation key as a navigation instrument, the sensor is not excessively loaded. The lifetime of the sensor thereby increases.

According to a preferred development of the present invention, the sensor can be arranged inside the actuating surface of the navigation key as a square set on the top. Due to the small dimensions of the multifunctional switch located under the navigation key, there is thus no complications in the setup of the data lines required at the sensor.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single Figure depicts the radio-operated communications terminal of the present invention.

DESCRIPTION OF THE PREFERRED EMBODIMENTS

The mobile telephone 1 has a keyboard 2, consisting of 12 keys, and a display 3. The navigation key 4, in the surface of which the sensor 5 is integrated, is arranged between the display 3 and the keyboard 2. With the appearance of Internet-capable mobile telephones, such navigation keys 4 for what are known as Internet browsers must be integrated in the keyboard 2. The navigation keys enable the movement of a cursor in a graphic display.

For the recognition of biometric data, sensors 5 are used, these being employed specifically for recognizing the fingerprint of the owner, for example. Such a sensor requires an area of approximately 100 to 200 mm$^2$, which is usually not available on the keyboard surface of the mobile telephone 1. In the present embodiment, the sensor 5, which recognizes the fingerprint, is arranged on the actuating surface of a navigation key 4, which is relatively large due to the functions performed therewith. A navigation in up to eight directions, as well as an actuation by pressing, can ensue with such a navigation key. The sensor 5 is arranged in a square position, i.e. in a square set on the top, so that the sensor can be reached comfortably not only by the left thumb but also by the right thumb of the user.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A mobile telephone radio-operated communications terminal, comprising:

a keyboard on a surface of the terminal;

a display spaced from the keyboard also on said surface;

a navigation key comprising a multi-function switch for navigating in at least two directions arranged on the surface between the keyboard and the display; and a sensor for recognizing biometric data, the sensor being integrated in an actuating surface of the navigation key.

2. The communication terminal according to claim 1, wherein the sensor is arranged within the actuating surface of the navigation key, the sensor having a square configuration and being set in a top of the navigation key.

3. A mobile telephone radio-operated communications terminal, comprising:

a keyboard at a lower portion of a surface of the terminal and a display at an upper portion of the surface when the terminal is positioned vertically, the navigation key having a top surface and being positioned at the surface between the keyboard and the display, the navigation key comprising a multi-function switch for navigating in a plurality of directions; and a sensor for recognizing biometric data, the sensor being integrated in the top surface of the navigation key.

4. The communication terminal according to claim 3, wherein the navigation key and sensor are positioned on the terminal such that the sensor can be reached by a right thumb of a user holding the terminal in his/her right hand and by a left thumb of a user holding the terminal in his/her left hand.

5. The communication terminal according to claim 3 wherein the navigation key is approximately square and the sensor is approximately square, the sensor being centered at a middle portion of the approximately square navigation key.

6. The communication terminal according to claim 3 wherein the sensor is approximately square and has an area from 100 to 200 mm$^2$.

7. The terminal according to claim 3 wherein the navigation key multi-function switch is for navigating in at least four directions.

8. The terminal according to claim 3 wherein the navigation key enables movement of a cursor in the graphic display for moving the cursor as part of an Internet browser.

9. The communication terminal according to claim 8 wherein the navigation key navigates in at least four directions.

10. The communication terminal according to claim 9 wherein the navigation key navigates in up to eight directions.

* * * * *